United States Patent [19]

Bobry

[11] Patent Number: 4,669,037
[45] Date of Patent: May 26, 1987

[54] ISOLATOR FOR POWER SYSTEM INSTRUMENT

[76] Inventor: Howard H. Bobry, 23351 Chagrin Blvd., Beachwood, Ohio 44122

[21] Appl. No.: 697,152

[22] Filed: Feb. 1, 1985

[51] Int. Cl.⁴ .................... H02M 3/335; H01J 29/52; H04N 5/04

[52] U.S. Cl. .................... 363/24; 324/118; 315/371; 315/384; 358/148

[58] Field of Search ............ 330/10; 307/296 R, 311; 324/118; 363/16, 24, 127, 69, 41; 323/902; 315/371, 384; 358/148–150

[56] References Cited

U.S. PATENT DOCUMENTS

| 3,708,672 | 1/1973 | Marinkovic | 323/902 X |
| 4,066,974 | 1/1978 | Reinhard | 330/10 |
| 4,191,929 | 3/1980 | Max et al. | 330/10 |
| 4,293,817 | 10/1981 | DeMichele | 330/10 X |
| 4,319,144 | 3/1982 | King et al. | 307/311 X |
| 4,396,882 | 8/1983 | Kellenbenz | 323/902 X |
| 4,479,175 | 10/1984 | Gille et al. | 363/41 |
| 4,565,962 | 1/1986 | Nagano | 323/902 X |

FOREIGN PATENT DOCUMENTS 0531141  4/1977  U.S.S.R. .................... 323/902

Primary Examiner—Patrick R. Salce
Assistant Examiner—Emanuel Todd Voeltz
Attorney, Agent, or Firm—Pearne, Gordon, McCoy & Granger

[57] ABSTRACT

A device for isolating an electrical instrument from an input voltage signal at a floating potential. The device includes a transformer with a center-tapped primary winding, a center-tapped secondary winding and a core magnetically coupling the primary and secondary windings. The input voltage signal is applied to an input terminal coupled to the center tap of the primary winding. A modulator circuit is connected to the primary winding for alternately applying the input voltage signal to opposite sections of the primary winding by means of photo FETs or the like for alternately switching the modulator circuit at a suitable modulating frequency. A demodulator circuit is connected to the secondary winding for alternately connecting each end of the secondary winding to a common return point to demodulate the output signal from the center tap of the secondary winding by means of FETs or the like. A control circuit at ground potential operates both the photo FETs of the modulator circuit and the FETs of the demodulator circuit.

4 Claims, 4 Drawing Figures

ISOLATOR FOR POWER SYSTEM INSTRUMENT

BACKGROUND OF THE INVENTION

This invention relates to circuit isolation devices and especially to devices for isolating a voltage signal that is "floating" at some potential, from another electrical device, such as, an electrical instrument. Normally, electrical instruments must be operated at ground potential for safety reasons.

More particularly the invention relates to circuit isolators that use:

(1) a transformer to convert one initial voltage signal floating at some potential (upon modulation) to a representative voltage signal (upon demodulation) at ground potential; and (2) photo responsive switch means such as photo field effect transistors (FETs) for modulating the initial voltage signal so that the control circuit for operating the modulating and demodulating circuits may be at ground potential.

It is frequently desirable to observe and/or measure voltage wave forms that are offset or "floating" by a significant voltage from ground. This is commonly accomplished by disconnecting the safety ground of the oscilloscope or other instrument being used, and allowing the instrument to float above ground potential. This practice is hazardous as accidental contact with the instrument case can result in lethal shock.

The types of electrical devices that need isolation of the type to which the present invention is directed include current shunts, physiological and medical instruments, and oscillographs and oscilloscope-type instruments.

Shunts (low value resistors), are often used for the measurement of DC current in applications such as power supplies, rectifiers, battery chargers, DC motor drives, inverters and battery plants. In many applications, the shunt voltage is to be monitored by a digital meter, or a current sensing and/or control device. In such applications there is frequently a need for the shunt to be "floating" at a different potential from ground than the instrumentation or control circuitry.

In the case of physiological and medical instruments, electrical isolation is essential for patient protection. Also, physiological signals are of very low voltage, and it is essential that the instrumentation used not introduce noise.

In the case of oscillographs and oscilloscopes, there are a wide range of applications where isolation may be desirable. These applications include power system monitoring, machine vibration monitoring, mechanical shock and vibration testing, and others.

As the need for such electrical devices has increased due to the expanding use of sophisticated power supply inverters, motor drives and the like, several devices have been introduced that isolate the voltage signal from the instrument thus allowing for safer utilization. For example, a transformer can provide isolation and a high degree of accuracy at medium to high frequencies. At low frequencies however the size of the transformer (i.e. the core area) must be increased in order to avoid saturation and this reduces accuracy at high frequencies. Transformer isolators cannot be used at all when the input signal has a DC component.

Photo couplers can also be used but these devices have wide variations in gain and poor linearity. Also, these devices are relatively slow so that their application is limited to the lower frequencies.

Isolators presently in use are large and expensive. The Tektronix AG902A, for example is a two channel isolator having a volume of about ⅜ cu. ft. and a weight of over 13 lbs. This device is larger, heavier and more expensive than many of the oscilloscopes it would be used with. Because of this inconvenience, the device is often too cumbersome to use.

The Tektronix device uses both transformer and optical coupling techniques to achieve a DC to 20 mhz band width. Photocouplers are used at low frequencies, transformers are used at high frequencies, and both circuits are used at midfrequencies where the outputs of both the transformers and the photocouplers are added together. This combination of outputs is difficult to adjust for uniform gain over a wide frequency range.

Isolator circuits are also found in isolation amplifiers. Typical isolation circuits for these amplifiers are found in the following U.S. patents:

U.S. Pat. No. 3,988,690
U.S. Pat. No. 4,066,974
U.S. Pat. No. 4,163,950
U.S. Pat. No. 4,191,929

The device of the present invention satisfies the problems and shortcomings identified above and affords other features and advantages heretofore not obtainable.

SUMMARY OF THE INVENTION

It is among the objects of the present invention to provide a circuit isolation device for converting an initial voltage signal floating at some voltage potential to a representative voltage signal at ground potential wherein the initial voltage signal may have a wide range of frequencies or in fact be a DC voltage.

Another object is to provide a circuit isolation device of the type described which is of low cost compact construction.

Still another object is to provide a circuit isolation device wherein the effect of the modulating circuit on the representative voltage signal at the output of the device is minimized.

These and other objects and advantages are obtained with the novel circuit isolation device of the invention which is effective to convert an initial voltage signal floating at some voltage potential to a representative voltage signal at a different voltage potential—generally ground. The device includes a transformer with a center tapped primary winding, a center tapped secondary winding and a core magnetically coupling the primary and secondary windings. The initial voltage signal is coupled by means of an input terminal, to the center tap of the primary winding. A modulator circuit is connected to the primary winding at opposite ends thereof and includes photo responsive switch means for alternately applying the initial voltage signal to opposite sections of the primary winding at a modulating frequency sufficiently high to assure very low magnetic flux density in the core, thus maintaining a high input impedance. A demodulator circuit is connected to the secondary winding and includes switching means for alternately connecting each end of the secondary winding to a common return point to demodulate the voltage signal from the center tap of the secondary winding at a demodulating frequency that is identical to the modulating frequency.

The modulating and demodulating functions are controlled by a control circuit that may be at the same voltage potential as the demodulator circuit (generally ground) for operating the photo responsive switching means and the demodulator circuit switching means in phase with the modulator circuit switching means. Accordingly, the demodulated voltage signal at the output terminals of the device is representative of the initial voltage signal presented to the input terminals.

In accordance with one aspect of the invention the effect of the switching action produced in the modulating circuit is minimized by relating the control signals produced by the control circuit to the phasing of a test instrument with which the circuit isolation device of the invention is used.

In accordance with still another aspect of the invention the effect of the switching signals of the modulating circuit is eliminated by using two center tapped transformers in parallel with their respective modulating circuits out of phase with one another.

DESCRIPTION OF THE PREFERRED EMBODIMENT

Figure 1:
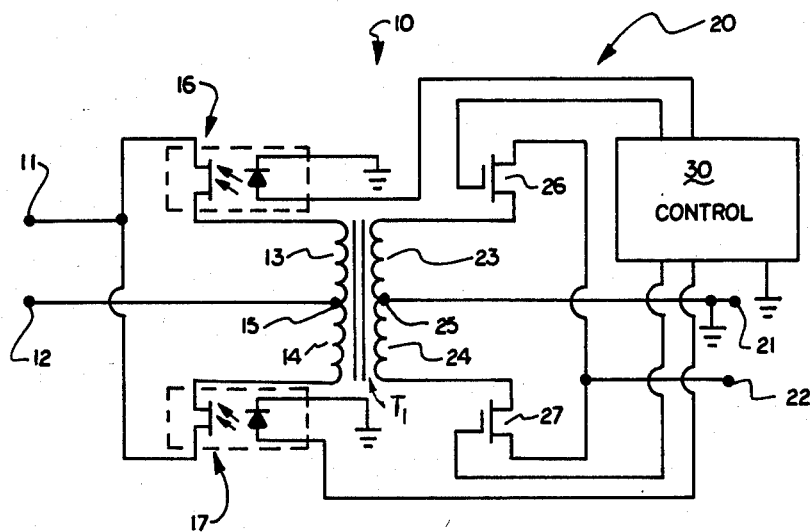
FIG. 1 is a schematic diagram of a circuit isolation device embodying the invention.

Referring more particularly to the drawings and intially to FIG. 1 there is shown a circuit isolation device for converting an initial voltage signal floating at some voltage potential to a representative voltage signal at a different voltage potential and embodying a unique arrangement of circuit elements in accordance with the invention.

The device comprises as its basic components a center tapped transformer T, a modulator circuit 10, a demodulator circuit 20 and a control circuit 30. The device is adapted to receive a voltage signal that is "floating" above ground potential and which is to be analyzed for example by an oscilloscope or other electrical instrument that is desirably maintained at ground potential. The transformer T has a primary winding with two sections 13 and 14 separated by a center tap 15. The center tap 15 is connected to the input terminal 12.

The input voltage signal (FIG. 2e) is applied to the primary sections 13 and 14 of the transformer T alternately by means of a pair of switching elements such as photo FETs 16 and 17 located in parallel branches of the modulator circuit. The parallel branches are connected between the terminal 11 and opposite ends of the transformer primary. The polarity of the voltage signal applied to the transformer primary windings is reversed periodically by the photo FETs 16 and 17 (FIGS. 2a and 2b) which serve as switches. The lowest frequency component applied to the transformer primary windings is that of the periodic switching of the photo FETs 16 and 17 so that saturation of the transformer core may be avoided even if the input signal is of very low or even zero frequency (DC).

The demodulator circuit 20 has a pair of output terminals 21 and 22 which may be connected to an oscilloscope or other electrical instrument to be isolated from the initial voltage signal. The transformer secondary winding includes two winding sections 23 and 24 separated by a center tap 25 which is connected to the output terminal 21. Another pair of switching elements such as field effect transistors 26 and 27 (FET's) are connected in parallel between the output terminal 22 and opposite ends of the secondary winding. The FET's 26 and 27 are alternately switched (FIGS. 2c and 2d) in phase with the switching of the photo FETs 16 and 17 so that the elements 16 and 26 are on while the elements 17 and 27 are off, and vice versa.

Accordingly, the initial voltage signal (FIG. 2e) is regularly and periodically modulated by the switching effect of the photo FETs 16 and 17 with the resultant modulated signal applied to the primary winding of the transformer T. The transformer action results in an essentially identical signal appearing at the secondary windings of the transformer although the magnitude of the signal may be increased or decreased depending upon the transformer turns ratio.

This secondary signal is demodulated by the switching action of the FET's 26 and 27. The output of the demodulator circuit 20 (FIG. 2f) is thus representative or, in effect, a reconstruction of the initial voltage signal applied to the input terminals 11 and 12.

The switching elements 16, 17, 26, 27 should ideally be solid state devices having a high "off" state impedance, a low "on" state impedance, and no threshhold or offset voltage. In addition these devices should be symmetrical; i.e. the characteristics should be the same for either polarity of the input signal. Bilateral FET's are particularly suited. The switching elements 26 and 27 may be individual, discreet transistors, or parts of an integrated circuit containing multiple devices such as an RCA CD4066 or equivalent.

Figure 2:
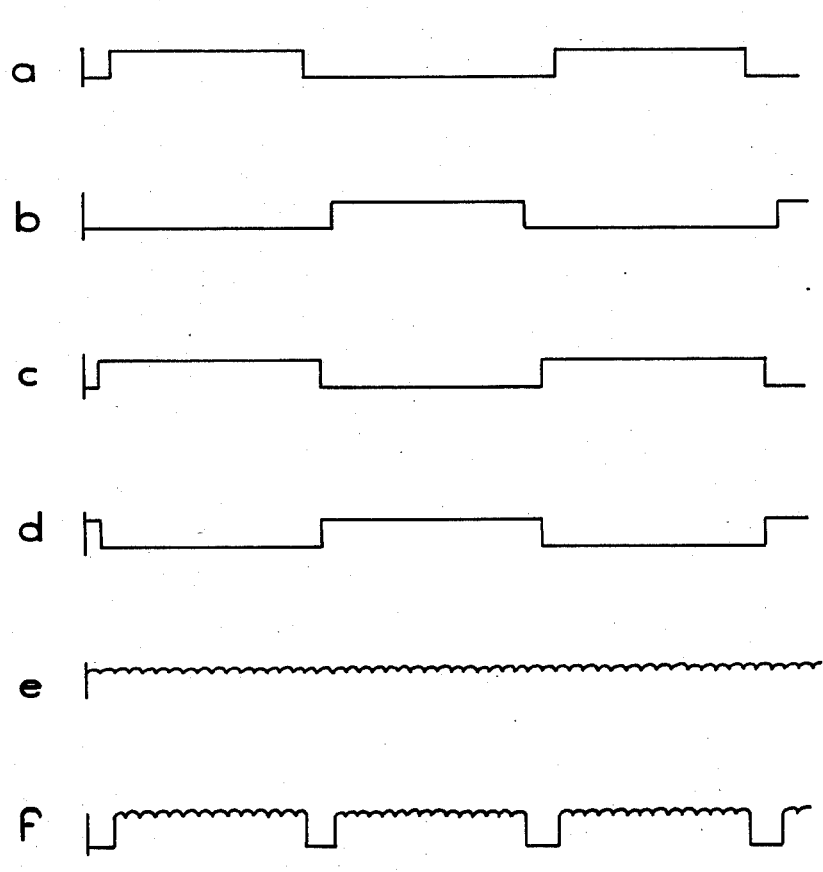
FIG. 2 is a series of graphs illustrating the phasing of the switching voltages (a, b, c and d) used to trigger the switching elements shown in FIG. 1, the initial voltage signal wave form (e) and the representative voltage signal wave form (f) at the output terminals of the device.

The switching of the elements 16, 17, 26, 27 is accomplished by means of the control circuit 30 to produce the control phasing illustrated in FIG. 2. Since the FET's 26 and 27 are on the secondary or output side of the isolator and thus generally at ground potential they may be driven by direct electrical interconnection with the control circuit. The elements 16 and 17, on the other hand are on the isolated, or primary, side of the isolator and must be operated in such a way that isolation is maintained, preferably without the use of an additional isolated power supply.

This requirement is satisfied through the use of light sensitive FET's or photo FET's. These devices may be separate, discreet transistors driven by separate light sources such as light emitting diodes (LED's), which are in turn driven by the control circuit 30 located on the secondary side of the transformer T. The preferred approach, however, is to use integrated isolator circuits which combine the LED and photo FET in a single package such as the G.E. H11F1 series. These integrated isolator devices can also be used for the switching means 26 and 27 on the secondary side if desired even though isolation of the secondary circuit from the control and drive circuitry is not generally required.

Although the circuit isolation device illustrated in FIG. 1 uses a center-tapped winding and two switching elements on both the primary and secondary sides, a bridge configuration of four switching elements and a nontapped winding could be substituted on either the primary, the secondary, or both sides of the circuit. This applies to the basic circuit described above as well as to more complex circuits to be described below.

The control circuit must drive the switching elements such that the elements 16 and 26 are "on" while the elements 17 and 27 are "off", and vice versa. A further consideration is that the "on" periods for the elements 16 and 17 must not be allowed to overlap due to the finite switching speeds of these devices. If the elements 16 and 17 are on simultaneously, the input to the isolator circuit will present a short circuit to the signal source. This can be avoided if the control circuit provides a "dead" time, or a brief interval between the turn off of one switching element and the turn on of the alternate switching element. This dead time should be slightly longer than the worst case turn off time for the switching devices used.

The dead time is not required however for the FET's 26 and 27 because if these devices have overlapping "on" periods the overlap will occur during the dead time of the elements 16 and 17. Accordingly there will be no effect on the signal source. The worst case switching speed for the G.E. H11F1 integrated photo isolator is 15 microseconds. Thus, with these devices a dead time of 20 microseconds would be completely adequate.

A control circuit 30 capable of providing the desired trigger signals described above may be readily designed by a person skilled in the art and will not be discussed in detail herein.

The isolator device described above and illustrated in FIGS. 1 and 2 is most useful for relatively low frequency signals. The dead time necessitated by the switching speeds of the photo FET's 16 and 17 limits the application of the isolator device shown to situations where the signal to be observed or measured is "slow" or of a much longer period than the dead time.

Some specific applications for the device of FIGS. 1 and 2 are as follows:

Where an oscilloscope or similar instrument that displays the input signal is used the isolator device may be used in a manner such that the dead time occurs only during intervals in which the signal is not being displayed; hence the dead time will not be visible to the observer. This may be accomplished as follows:

A triggered oscilloscope sweeps an electron beam across the face of a cathode ray tube, thus displaying the input signal at a user selected speed, in response to a specific trigger event. The trigger event may be a voltage level at the input, or a separate signal. There is, inherently, a deadtime between sweeps. The electron beam must be returned from its ending position at the end of one sweep to the starting position for the next sweep, then the trigger event must occur again to cause the next sweep to begin. At high speeds, the repeated sweeps occur so frequently that the display appears to be continuously showing the input signal. If the dead times of the oscilloscope and the isolator device are made to coincide then the dead time of the isolator device will not be visible to the user.

For example, if the operator has set the oscilloscope such that each complete sweep will take ten microseconds and if upon the completion of the sweep we allow an interval of 20 microseconds dead time to allow the isolator circuit to switch as previously described, the interval will be more than adequate for the return of the electron beam to the starting position of the next sweep. At the end of the dead time the trigger circuit is armed so that another sweep will be started when the proper trigger conditions occur.

If a trigger event does not occur after a reasonable delay, a sweep may be triggered automatically. This is known as the "auto" mode on triggered sweep oscilloscopes. The isolator circuit need not be switched at the end of every sweep.

Sweeps may occur for example every 30 microseconds depending on how soon a trigger event occurs after the dead time. The isolator circuit may, for example, have been designed such that switching could occur every 300 microseconds. In this case switching of the isolator should occur only once for every ten sweeps of the oscilloscope. Even if the oscilloscope is not triggered by an appropriate signal, the self triggering which occurs in the "auto" mode will assure that the isolator is switched.

Ideally the control circuit as well as the isolator are to be an integral part of an oscilloscope. There are several ways in which trigger operation may be achieved if the isolator is designed as an external accessory, however. The isolator can be produced with a built in trigger circuit, similar to that used in an oscilloscope. The isolator's trigger circuit may be used to trigger the oscilloscope by means of the scope's external trigger input. Similarly the scope's sweep circuits could also be built into the isolator, with the isolator driving the oscilloscope's external sweep input.

Alternatively, when the isolator is used with oscilloscopes that provide an output signal corresponding with the sweep, the sweep signal could be used to drive the isolator at either the same frequency or some integral divisor of the sweep frequency. A manual control on the isolator would allow the user to phase shift the dead time of the isolator with respect to the oscilloscope sweep, so that the dead time would occur during the oscillioscope's dead time (if long enough) or at least during an unimportant portion of the displayed wave form.

Finally, the isolator could be driven by an internal oscillator that is manually adjustable by the user over a narrow frequency range. This would allow the user to adjust the isolator as described above, or to "hide" the deadtime during the oscilloscope's deadtime or move the deadtime to an unimportant part of the wave form.

Figure 3:
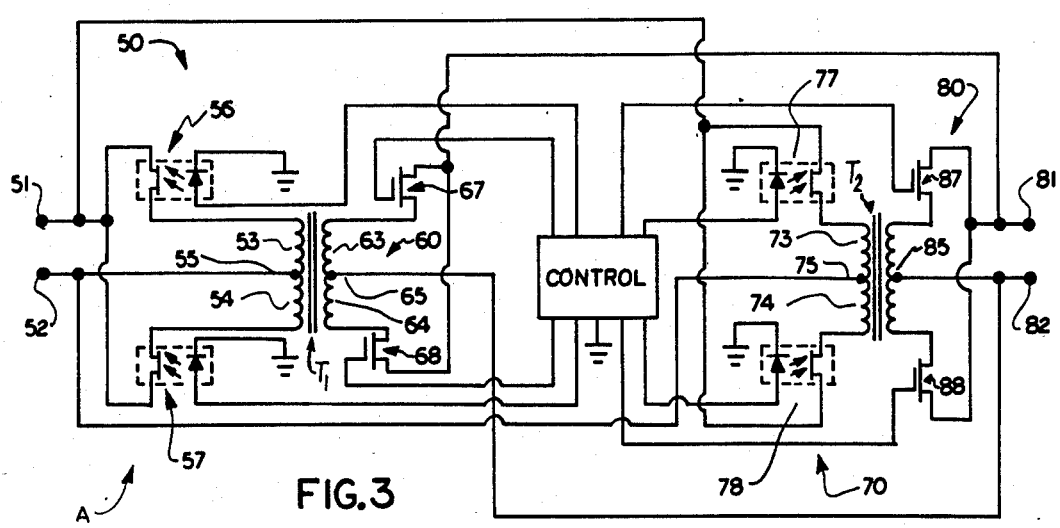
FIG. 3 is a schematic diagram of a circuit isolation device embodying a modified form of the invention.
Figure 4:
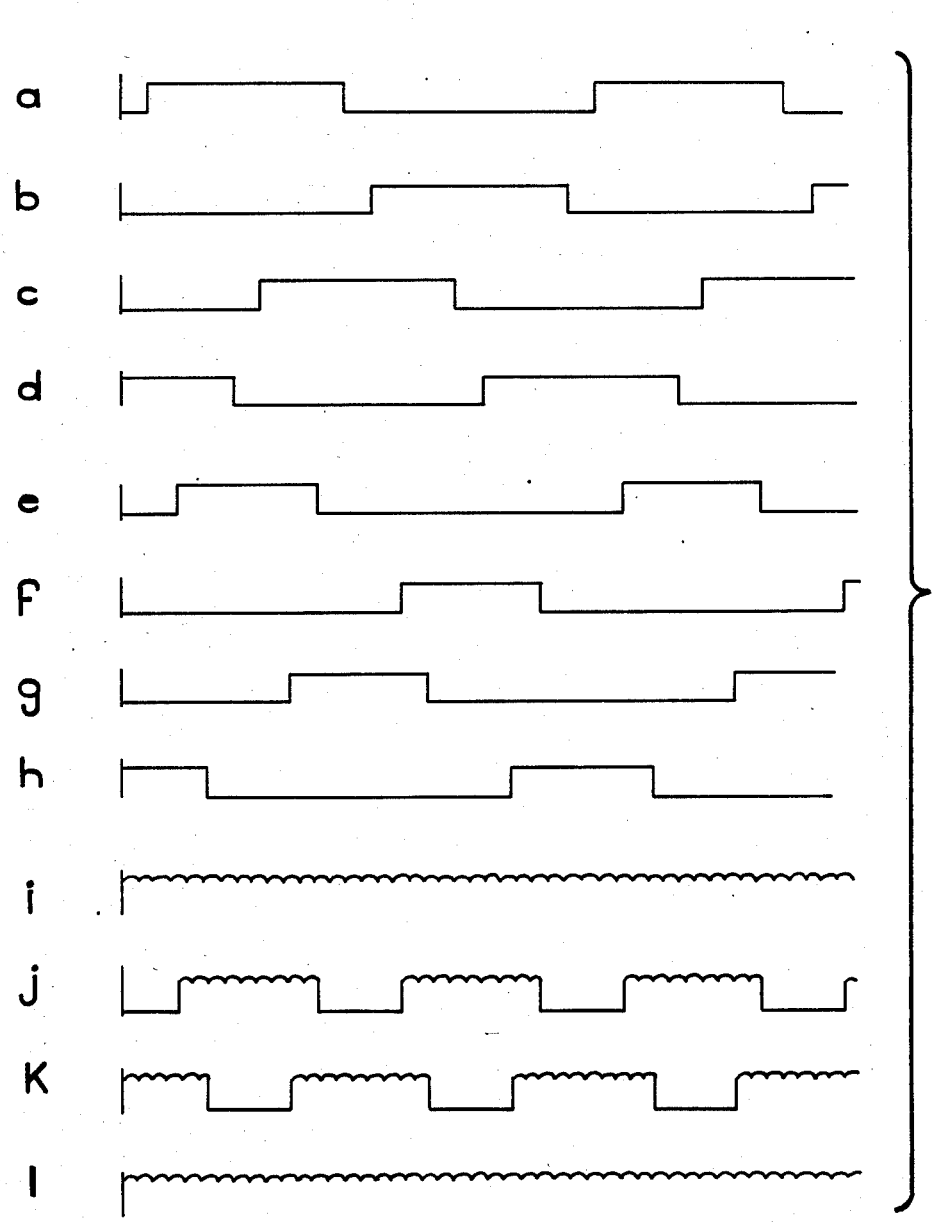
FIG. 4 is a series of graphs illustrating the phasing of the signal voltages (a, b, c, d, e, f, g and h) used to trigger the switching elements shown in FIG. 3, the initial voltage signal (i) presented at the input terminals, the representative voltage signal (j) produced by one demodulator circuit section, the representative voltage signal (k) produced at the other demodulator circuit section and the resulting representative voltage signal (l) produced at the output terminals of the device.

Dual Modulator Arrangement (FIGS. 3 and 4)

FIGS. 3 and 4 illustrate another embodiment of the invention which is adapted to eliminate the potential disturbance caused by the dead time described above.

As illustrated in FIG. 3 the modified isolator device includes two isolator sections A and B and a pair of center tapped transformers T1 and T2, one for each of the two isolator sections, and a control circuit 90.

The isolator section A comprises a modulator circuit 50, the center tapped transformer T1 and a demodulator circuit 60. The modulator circuit 50 is adapted to receive an initial voltage signal (FIG. 4i) at a "floating" potential at input terminals 51 and 52. The transformer T1 has a primary winding with two sections 53 and 54 separated by a center tap 55. The initial voltage signal is applied to the primary winding of the transformer T1 by means of the switching effect of a pair of switching elements 56 and 57 located in parallel branches connected between the input terminal 51 and opposite ends of the primary winding.

The demodulator circuit 60 includes the secondary winding of the transformer T1 which includes two winding sections 63 and 64 separated by a center tap 65. The signal induced in the secondary winding is demodulated by means of a pair of switching elements 67 and 68 located in parallel branches that are connected at opposite ends of the secondary winding illustrated in FIG. 3.

Isolator section B is essentially identical to isolator section A except that the control circuit 90 is adapted to alternate the phasing of the control signals to the modulator circuit 70 and demodulator circuit 80. As in the case of the isolator section A the modulator circuit 70 includes primary windings for the transformer T2 including transformer sections 73 and 74 separated by a center tap 75. The center tap 75 (as the center tap 55) is connected to the input terminal 52 and a pair of switching elements 77 and 78 are located in parallel branches connected between the input terminal 51 and opposite ends of the primary winding of the transformer T2.

The demodulator circuit 80 includes a pair of output terminals 81 and 82 that are essentially the output terminals of the circuit isolator device. The circuit 80 includes the secondary winding of the transformer T2 which has two secondary sections 83 and 84 separated by a center tap 85 connected to the output terminal 82. A pair of switching elements 87 and 88 are located in parallel branches connected between the output terminal 81 at opposite ends of the secondary winding of the transformer T2.

The control of the modulator circuits 50 and 70 and the demodulator circuits 60 and 80 is illustrated in FIG. 4, parts a through h. The phasing of the switching elements 56 and 57 of the modulator circuit 50 is illustrated in FIGS. 4a and 4b, of the elements 67 and 68 of the demodulator circuit 60 in FIGS. 4e and 4f, of the elements 77 and 78 of the modulator circuit 70 in FIGS. 4c and 4d, and of the elements 87 and 88 of the demodulator circuit 80 in FIGS. 4g and 4h.

It will be noted that the modulation achieved by the circuits 50 and 70 is out of phase so that the dead spaces are likewise offset. Accordingly, the outputs of isolator sections A and B would appear as shown in parts j and k of FIG. 4 if they were not connected in parallel. The resulting representative output voltage signal that appears across the terminals 81 and 82 is illustrated in part 1 and it will be noted that the effect of the dead spaces between modulation phases has been eliminated.

Both isolator sections A and B are operated in the same manner and at the same frequency, but the operation of the isolator circuit B is phase shifted from that of the isolator circuit A such that the "off" time of each isolator occurs during a period in which no switching occurs in the other isolator section.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. An instrument isolator for isolating a voltage signal at a floating potential, applied to a pair of input terminals of one circuit, from an electrical instrument at ground potential adapted to receive and process said voltage signal and having a display consisting of a periodically repeated electronic image with a time interval between images, initiated by a cyclically triggered signal, comprising:

a transformer with a center-tapped primary winding, a center-tapped secondary winding and a core magnetically coupling the primary and secondary windings;

terminal means coupling said voltage signal directly to the center tap of said primary winding;

a modulator circuit connected to said primary winding for alternately applying said voltage signal to opposite sections of said primary winding and including self-contained photoelectric switching elements for alternately switching said modulator circuit at a suitable modulating frequency;

a demodulator circuit connected to said secondary winding for alternately connecting each end of the secondary winding to a common return point to demodulate the output signal from the center tap of the secondary winding and including second switching elements in phase with said photoelectric switching elements for alternately switching said demodulator circuit; and control means for operating said photoelectric switching elements and said second switching elements to provide a time interval between alternating pulses of said modulating frequency so as to avoid overlap between half cycles;

said control means being operatively connected to said electrical instrument whereby said trigger signal synchronizes said time interval between images with said time interval between alternating pulses of said modulating frequency, whereby the demodulator output signal is representative of said input voltage signal and electrically isolated from said input terminals and said time interval between pulses is not visible on said instrument display.

2. A device as defined in claim 1, wherein said photoelectric switch means comprises a pair of photo field effect transistors.

3. A device as defined in either claim 1 or claim 2, wherein said second switching means comprises a pair of field effect transistors.

4. An instrument isolator for isolating a voltage signal at a floating potential applied to a pair of input terminals of one circuit from a signal receiving circuit comprising:

a first isolator section and a second isolator section connected in parallel with one another, each of said isolator sections comprising:

a transformer with a center-tapped primary winding, a center-tapped secondary winding and a core magnetically coupling the primary and secondary windings;

terminal means connected to the center tap of said primary winding and adapted to receive a voltage signal;

a modulator circuit connected to said primary winding for alternately applying said voltage signal to opposite sections of said primary winding and including photoelectric switching means for alternately switching said modulator circuit at a suitable modulating frequency;

a demodulator circuit connected to said secondary winding for alternately connecting each end of the secondary winding to a common return point to demodulate the output signal from the center tap of the secondary winding and including second switching means in phase with said photoeletric switching means for alternately switching said demodulator circuit;

control means operatively connected to both of said isolator sections for operating said photoelectric switching means of each section and said second switching means of each section in a manner such that the modulator circuits and demodulator circuits of said two sections are in staggered phase relation to one another;

whereby the demodulator output voltage signal from said parallel isolator section is representative of the input voltage signal to said parallel isolator sections and electrically isolated from said input terminals.

* * * * *